(12) United States Patent
Haught et al.

(10) Patent No.: US 11,988,331 B2
(45) Date of Patent: May 21, 2024

(54) GRAVITY OILER IMPROVEMENT

(71) Applicant: Esco Products, Inc, Houston, TX (US)

(72) Inventors: Christopher Haught, Houston, TX (US); David Haught, Houston, TX (US)

(73) Assignee: Esco Products, Inc, Houston, TX (US)

( * ) Notice: Subject to any disclaimer, the term of this patent is extended or adjusted under 35 U.S.C. 154(b) by 0 days.

(21) Appl. No.: 18/169,828

(22) Filed: Feb. 15, 2023

(65) Prior Publication Data

US 2023/0258296 A1 Aug. 17, 2023

Related U.S. Application Data

(60) Provisional application No. 63/310,104, filed on Feb. 15, 2022.

(51) Int. Cl.
*F16N 7/02* (2006.01)

(52) U.S. Cl.
CPC ..................... *F16N 7/02* (2013.01)

(58) Field of Classification Search
CPC .............. F16N 7/02; F16N 29/00; G01C 9/00
USPC ............................................. 184/65; 137/454
See application file for complete search history.

(56) References Cited

U.S. PATENT DOCUMENTS

| | | | | |
|---|---|---|---|---|
| 2,979,161 A | * | 4/1961 | Lyden | F16N 19/006 137/453 |
| 4,342,376 A | * | 8/1982 | Lyden | F01M 11/12 184/96 |
| 4,895,222 A | * | 1/1990 | Hoffmann | G05D 9/02 184/65 |
| 7,845,813 B1 | * | 12/2010 | Beck | F16N 29/02 184/7.4 |

* cited by examiner

*Primary Examiner* — Michael R Mansen
*Assistant Examiner* — Mark K Buse
(74) *Attorney, Agent, or Firm* — Shannon Warren

(57) ABSTRACT

A gravity oiler assembly for for passively managing a fluid within an input fluid reservoir for use in an equipment fluid reservoir. The gravity oiler assembly comprises a fitting, the input fluid reservoir, and a nozzle. The fitting comprises an outer surface, an inner cavity, a top aperture, and a side aperture. The input fluid reservoir comprises a bottle being arranged with a fluid passage attached to the nozzle. The nozzle is arranged below the input fluid reservoir and inserted into the top aperture of the fitting. The gravity oiler assembly is configured to allow the fluid in the input fluid reservoir to enter a portion of the nozzle, the inner cavity and the side aperture. The gravity oiler assembly is configured to store the fluid in the input fluid reservoir and passively dispense the fluid into an equipment fluid cavity of the equipment fluid reservoir.

15 Claims, 16 Drawing Sheets

GRAVITY OILER IMPROVEMENT

CROSS-REFERENCE TO RELATED APPLICATIONS

This application claims benefit to U.S. provisional application 63/310,104 filed 2022 Feb. 15.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BRIEF SUMMARY OF THE INVENTION

A gravity oiler assembly for passively managing a fluid within an input fluid reservoir for use in an equipment fluid reservoir. The gravity oiler assembly comprises a fitting, the input fluid reservoir, and a nozzle. The fitting comprises an outer surface, an inner cavity, a top aperture, and a side aperture. The input fluid reservoir comprises a bottle being arranged with a fluid passage attached to the nozzle. The nozzle is arranged below the input fluid reservoir and inserted into the top aperture of the fitting. The gravity oiler assembly is configured to allow the fluid in the input fluid reservoir to enter a portion of the nozzle, the inner cavity and the side aperture. The gravity oiler assembly is configured to store the fluid in the input fluid reservoir and passively dispense the fluid into an equipment fluid cavity of the equipment fluid reservoir.

BACKGROUND OF THE INVENTION

No relevant prior art is known to the Applicant.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
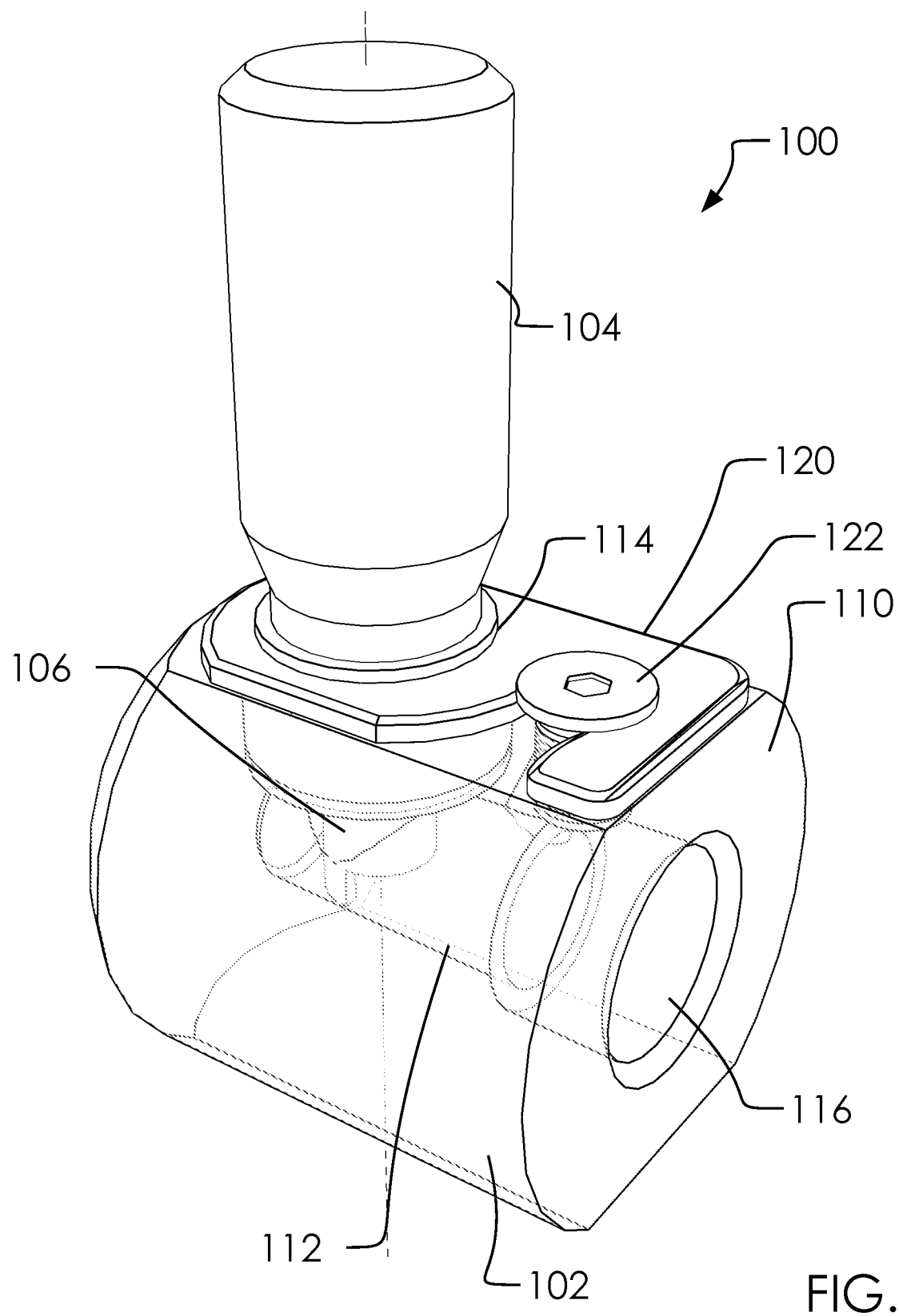
FIG. 1 illustrates a perspective overview of a gravity oiler assembly 100.

FIG. 1 illustrates a perspective overview of a gravity oiler assembly 100.

In one embodiment, said gravity oiler assembly 100 can comprise a fitting 102, an input fluid reservoir 104, and a nozzle 106. Said input fluid reservoir 104 can comprise a bottle being arranged with a fluid passage 108 (illustrated below) attached to said nozzle 106.

In one embodiment, said fitting 102 can comprise an outer surface 110, an inner cavity 112, a top aperture 114, and a side aperture 116.

In one embodiment, said nozzle 106 can be inserted into said top aperture 114 of said fitting 102 and allow a fluid 118 in said input fluid reservoir 104 to enter a portion of said nozzle 106, said inner cavity 112 and said side aperture 116, illustrated below.

Said gravity oiler assembly 100 can further comprise a dust shield 120 and a dust shield fastener 122.

In one embodiment, said fitting 102 can comprise a transparent material, as illustrated. On example can comprise a plastic, glass, or similar, as is known in the art.

Figure 2:
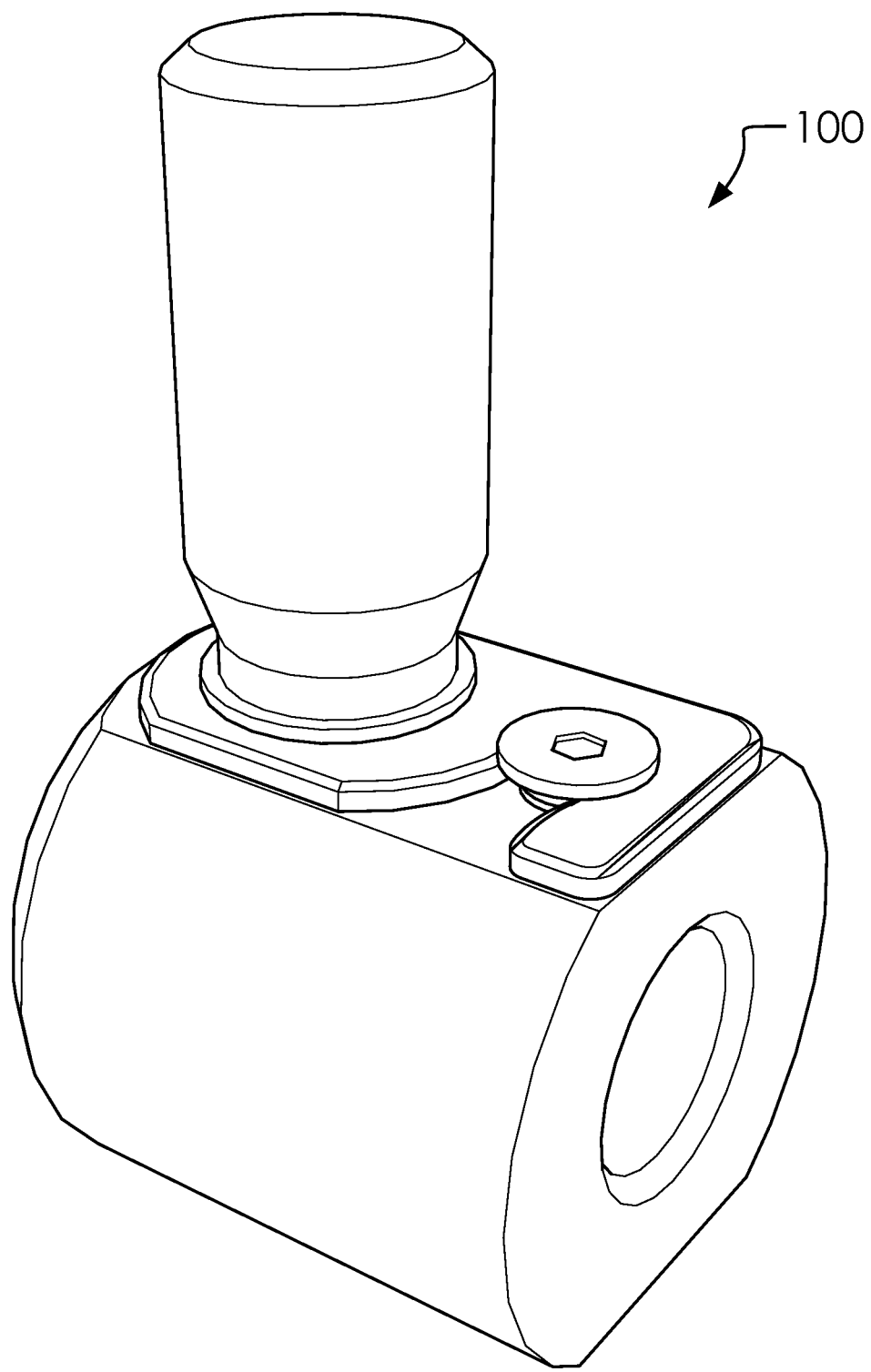
FIG. 2 illustrates a second perspective overview of said gravity oiler assembly 100.

FIG. 2 illustrates a second perspective overview of said gravity oiler assembly 100.

Figure 3:
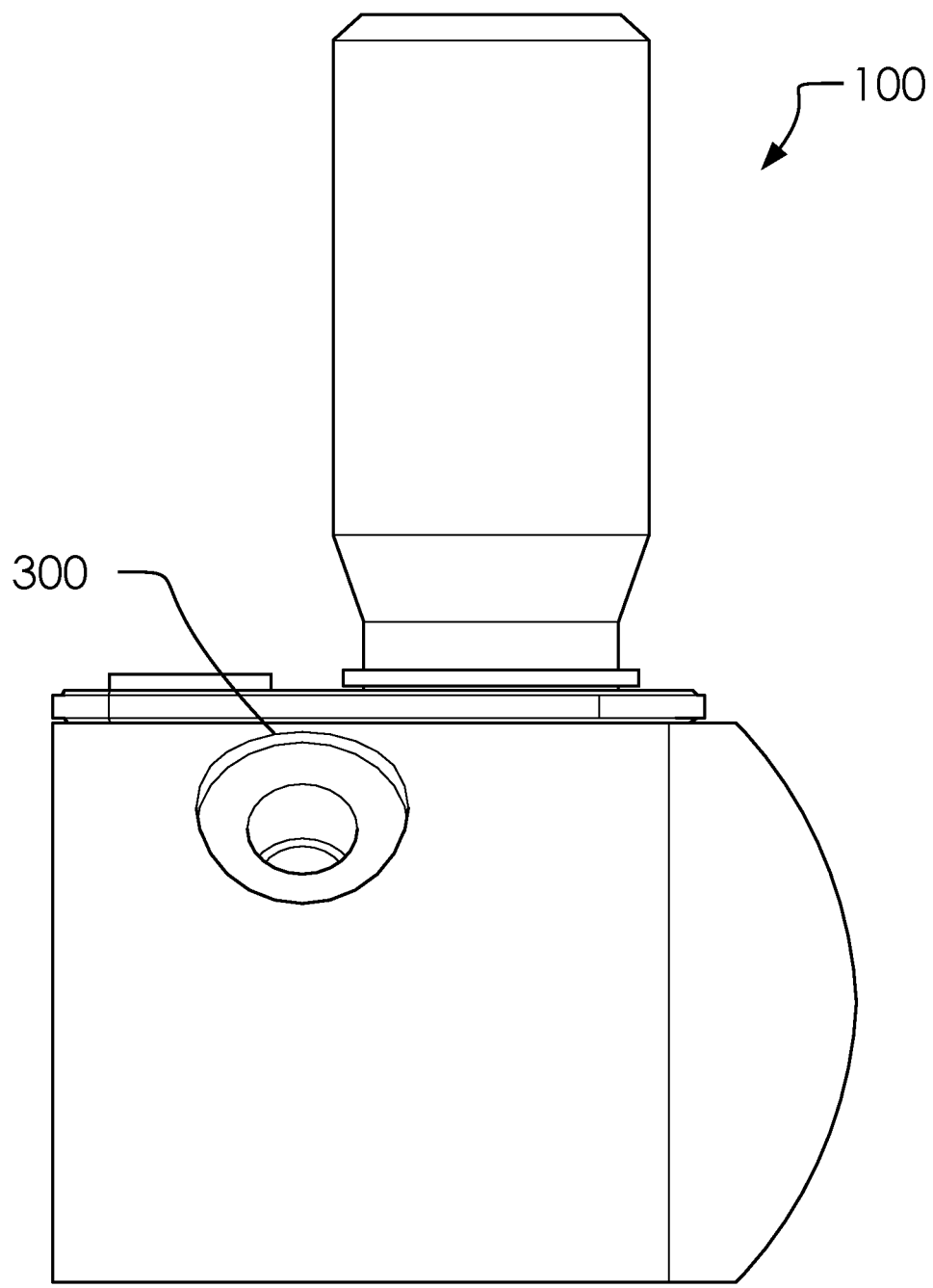
FIG. 3 illustrates an elevated side view of said gravity oiler assembly 100.

FIG. 3 illustrates an elevated side view of said gravity oiler assembly 100.

In one embodiment, said fitting 102 can further comprise a vent port 300.

Figure 4:
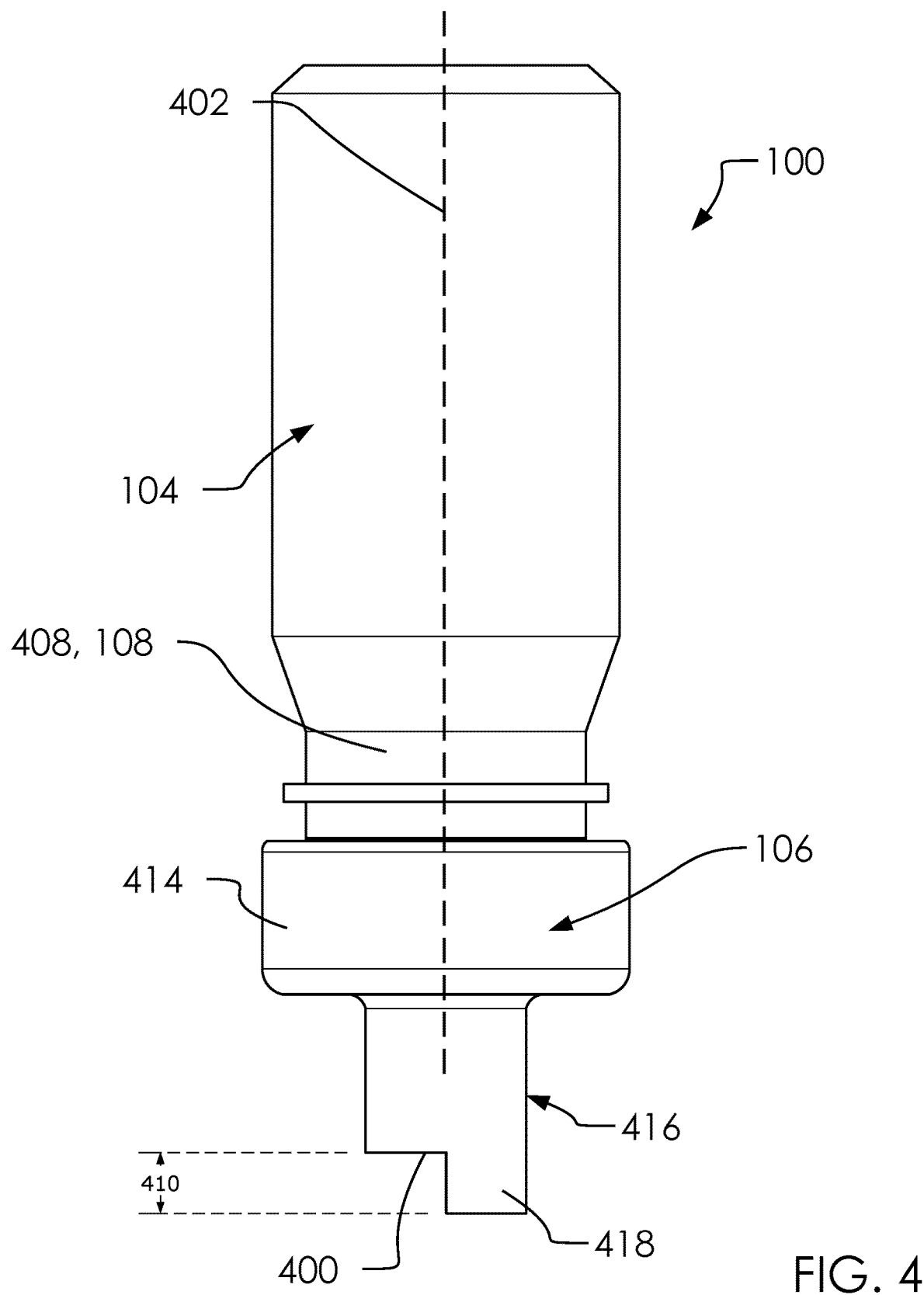
FIG. 4 illustrates an elevated side view of an input fluid reservoir 104 and a nozzle 106.

FIG. 4 illustrates an elevated side view of said input fluid reservoir 104 and said nozzle 106.

In one embodiment, said nozzle 106 can comprise a fluid notch 400, a center axis 402, a bottle receiver 414, and a lower nozzle 416.

In one embodiment, said lower nozzle 416 can comprise an extended lower portion 418 and said fluid notch 400. Wherein, said fluid notch 400 can comprise a portion of said lower nozzle 416 to be open to allow said fluid 118 within said input fluid reservoir 104 to flow out. In one embodiment, said fluid notch 400 can be nozzle exit height 410 compared with said extended lower portion 418.

In one embodiment, said nozzle exit height 410 can comprise a distance between the bottom of said fluid notch 400 and an upper edge of said fluid notch 400.

In one embodiment, said input fluid reservoir 104 can comprise said fluid passage 108; wherein, said input fluid reservoir 104 can be attached to said nozzle 106 by placing said fluid passage 108 at a lower end 408 of said input fluid reservoir 104 and attaching said input fluid reservoir 104 to a portion of said nozzle 106. In this manner, said input fluid reservoir 104 can be considered an upside down fluid reservoir being designed to naturally empty said fluid 118 from a fluid cavity 406 (illustrated below) in said input fluid reservoir 104.

In one embodiment, a portion of said input fluid reservoir 104 and said nozzle 106 can comprise male and female threading configured to mate with one another.

Figure 5:
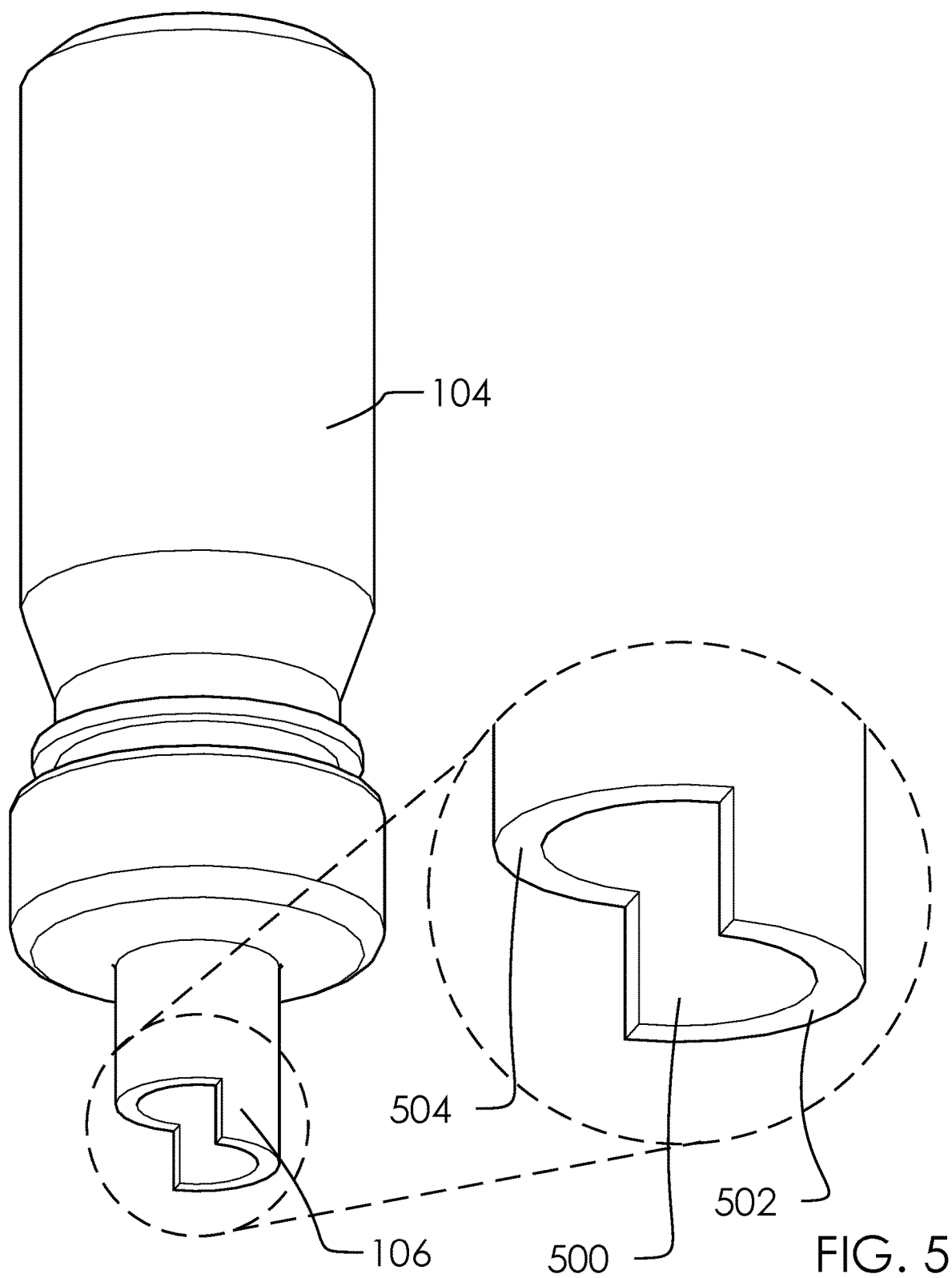
FIG. 5 illustrates a perspective lower view of said input fluid reservoir 104 and said nozzle 106, and a detailed lower view of a fluid notch 400 of said nozzle 106.

FIG. 5 illustrates a perspective lower view of said input fluid reservoir 104 and said nozzle 106, and a detailed lower view of said fluid notch 400 of said nozzle 106.

In one embodiment, said fluid notch 400 can comprise a fluid exit 500, a lower edge 502 and an upper edge.

In one embodiment, said fluid exit 500 can be located in a lowest portion of said nozzle 106. Said lower edge 502 can comprise a surface around said fluid exit 500.

Said fluid notch 400 can comprise a cut in a portion of said nozzle 106. Said fluid notch 400 can comprise said lower edge 502 and said upper edge 504. In one embodiment, said lower edge 502 and said upper edge 504 can be substantially parallel with one another and perpendicular to said center axis 402. Said lower edge 502 and said upper edge 504 can be separated by said nozzle exit height 410. In one embodiment, said fluid notch 400 can allow said fluid 118 to break surface tension when emptying out of said input fluid reservoir 104 and into a portion of said fitting 102.

Figure 6:
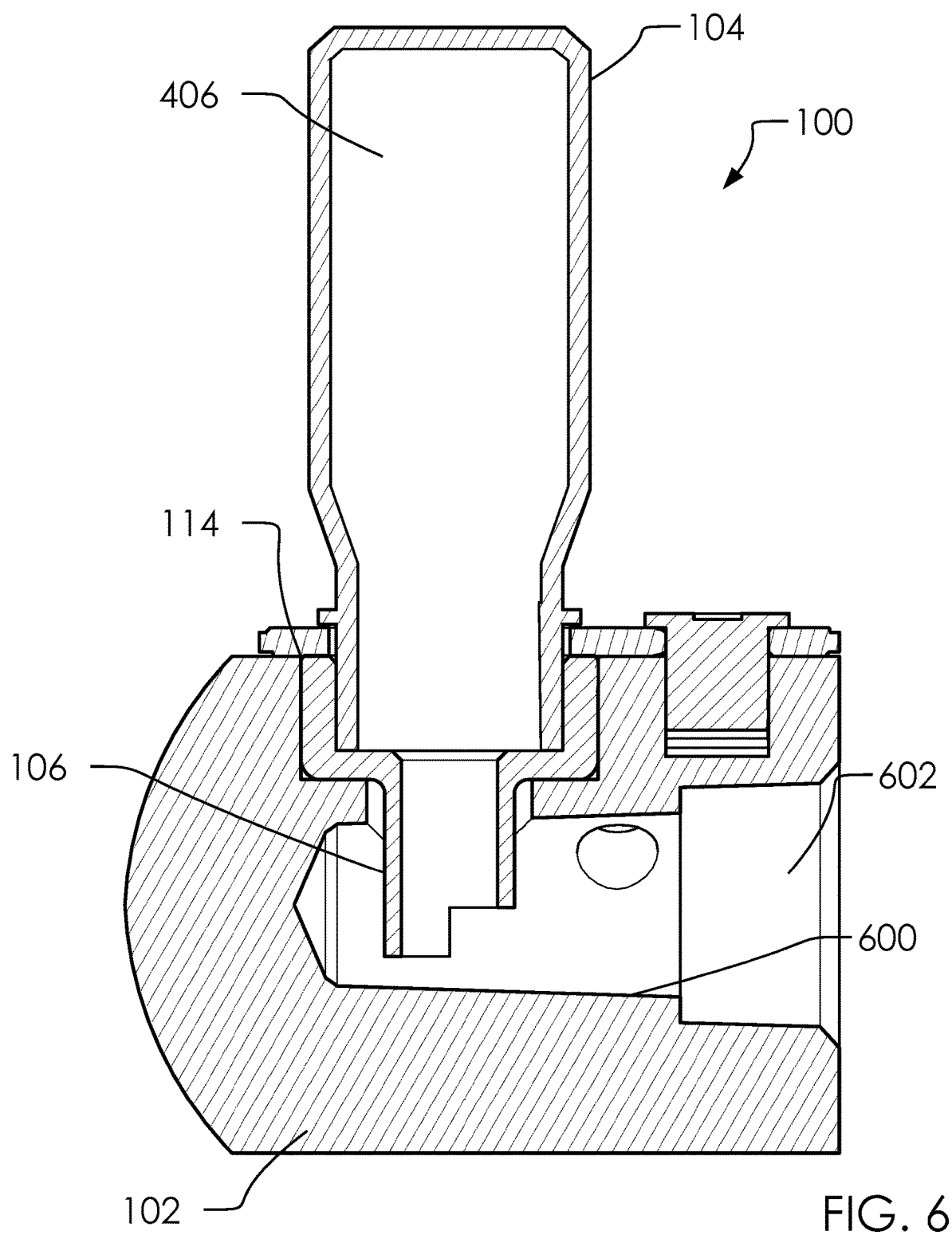
FIG. 6 illustrates an elevated cross-section side view of said gravity oiler assembly 100.

FIG. 6 illustrates an elevated cross-section side view of said gravity oiler assembly 100.

In one embodiment, said input fluid reservoir 104 can fit within a portion of said nozzle 106, and said nozzle 106 can fit in said top aperture 114 of said fitting 102. Wherein, said fluid cavity 406 of said input fluid reservoir 104 can be in fluid connection with said inner cavity 112 of said fitting 102, as illustrated.

In one embodiment, said inner cavity 112 can comprise a threaded socket 602 at said side aperture 116, as discussed below. Likewise, a threading can hold a portion of said input fluid reservoir 104 to said nozzle 106, as is known in the art.

In one embodiment, an O-ring can be included between a portion of said top aperture 114 and said nozzle 106 and/or said input fluid reservoir 104.

Figure 7:
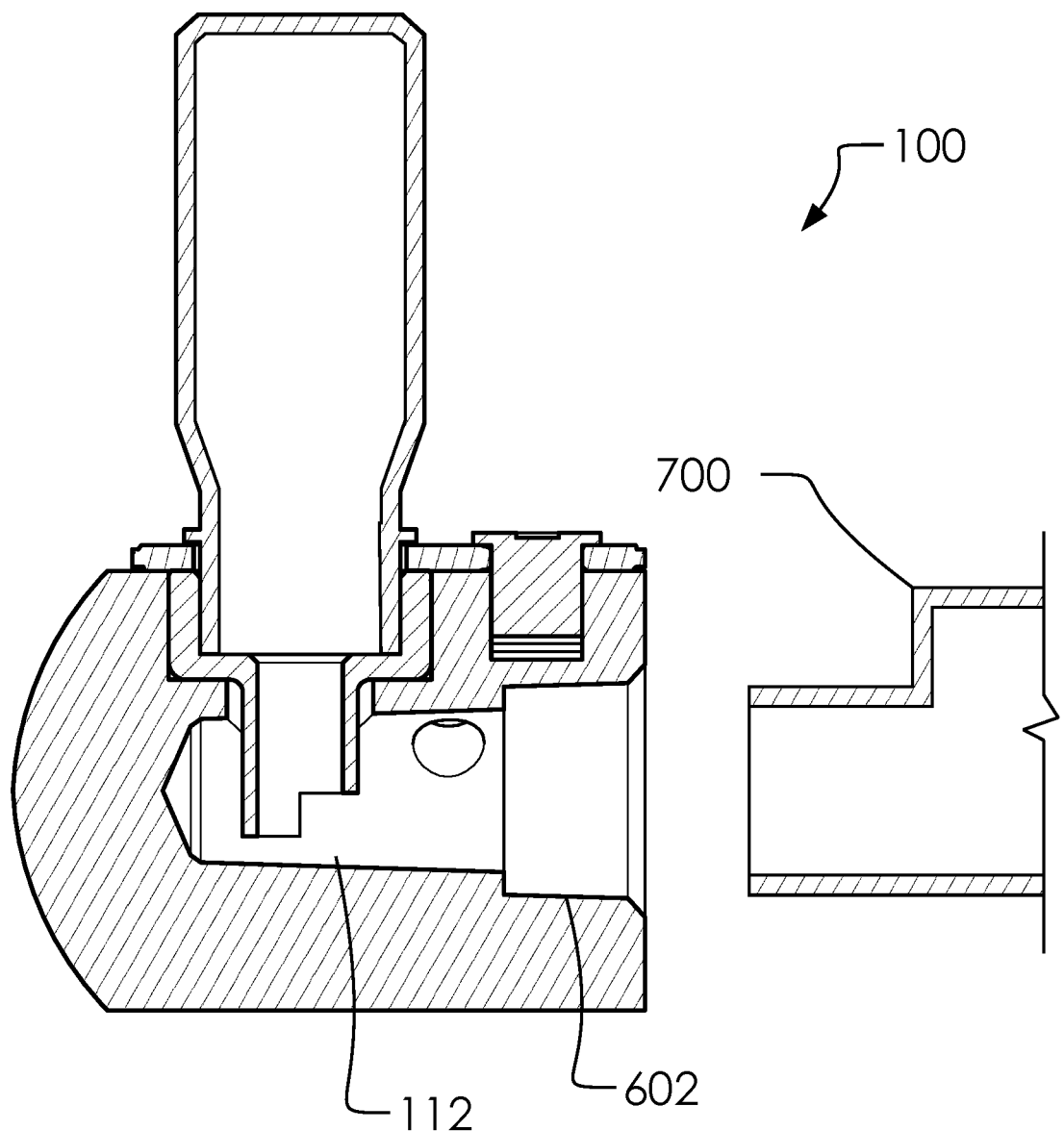
FIG. 7 illustrates a perspective overview of said gravity oiler assembly 100 attached to an equipment fluid reservoir 700.

FIG. 7 illustrates a perspective overview of said gravity oiler assembly 100 attached to an equipment fluid reservoir 700.

In one embodiment, said equipment fluid reservoir 700 can comprise an industrial equipment and said fluid 118 can comprise oil for lubricating said equipment, as is known in the art.

Figure 8:
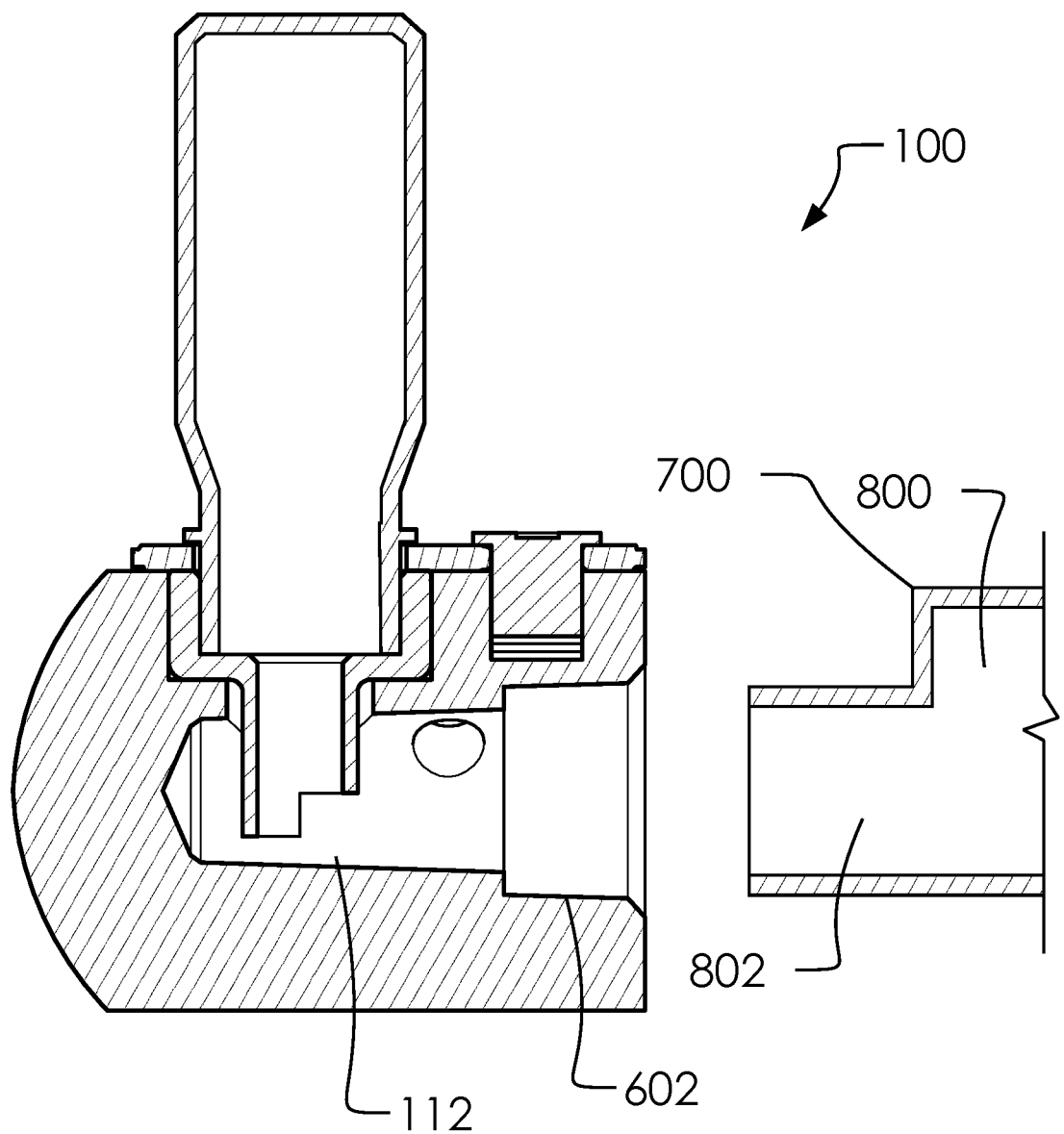
FIG. 8 illustrates an elevated cross-section side view of said gravity oiler assembly 100 unattached to said equipment fluid reservoir 700.

FIG. 8 illustrates an elevated cross-section side view of said gravity oiler assembly 100 unattached to said equipment fluid reservoir 700.

In one embodiment, said equipment fluid reservoir 700 can comprise said equipment fluid cavity 800 and a fluid intake 802, as illustrated.

Figure 9:
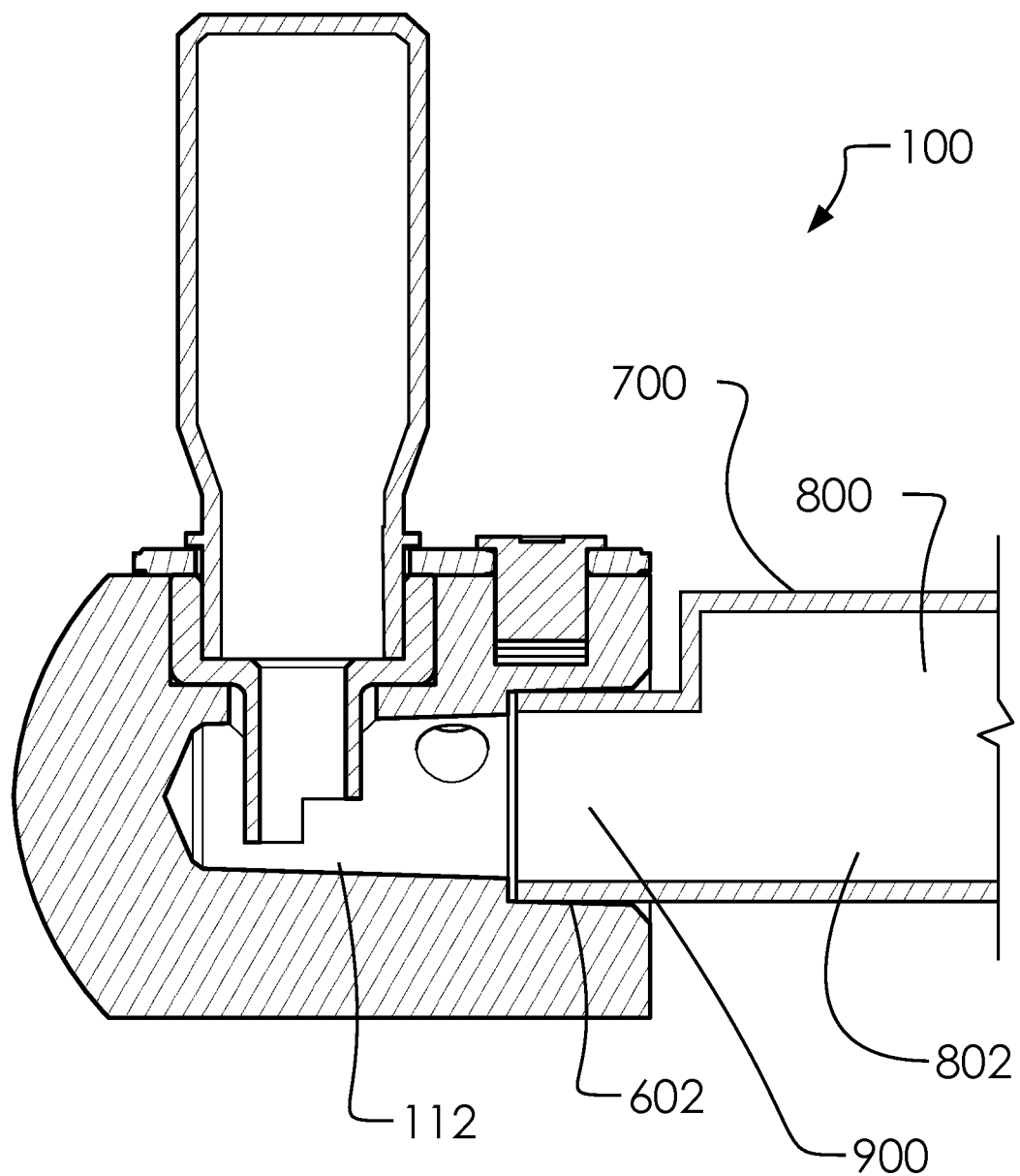
FIG. 9 illustrates an elevated cross-section side view of said gravity oiler assembly 100 attached to said equipment fluid reservoir 700.

FIG. 9 illustrates an elevated cross-section side view of said gravity oiler assembly 100 attached to said equipment fluid reservoir 700.

In one embodiment, said fluid intake 802 and said equipment fluid cavity 800 of said equipment fluid reservoir 700 can be in fluid connection with said inner cavity 112 of said fitting 102. Wherein, a fluid intake receiver 900 can selectively attach to said threaded socket 602 of said fitting 102. Further wherein, said threaded socket 602 can comprise an inner threading and a portion of said equipment fluid reservoir 700 can comprise an external threading around a portion of said fluid intake receiver 900 which can be adapted for sealing with one another.

Figure 10:
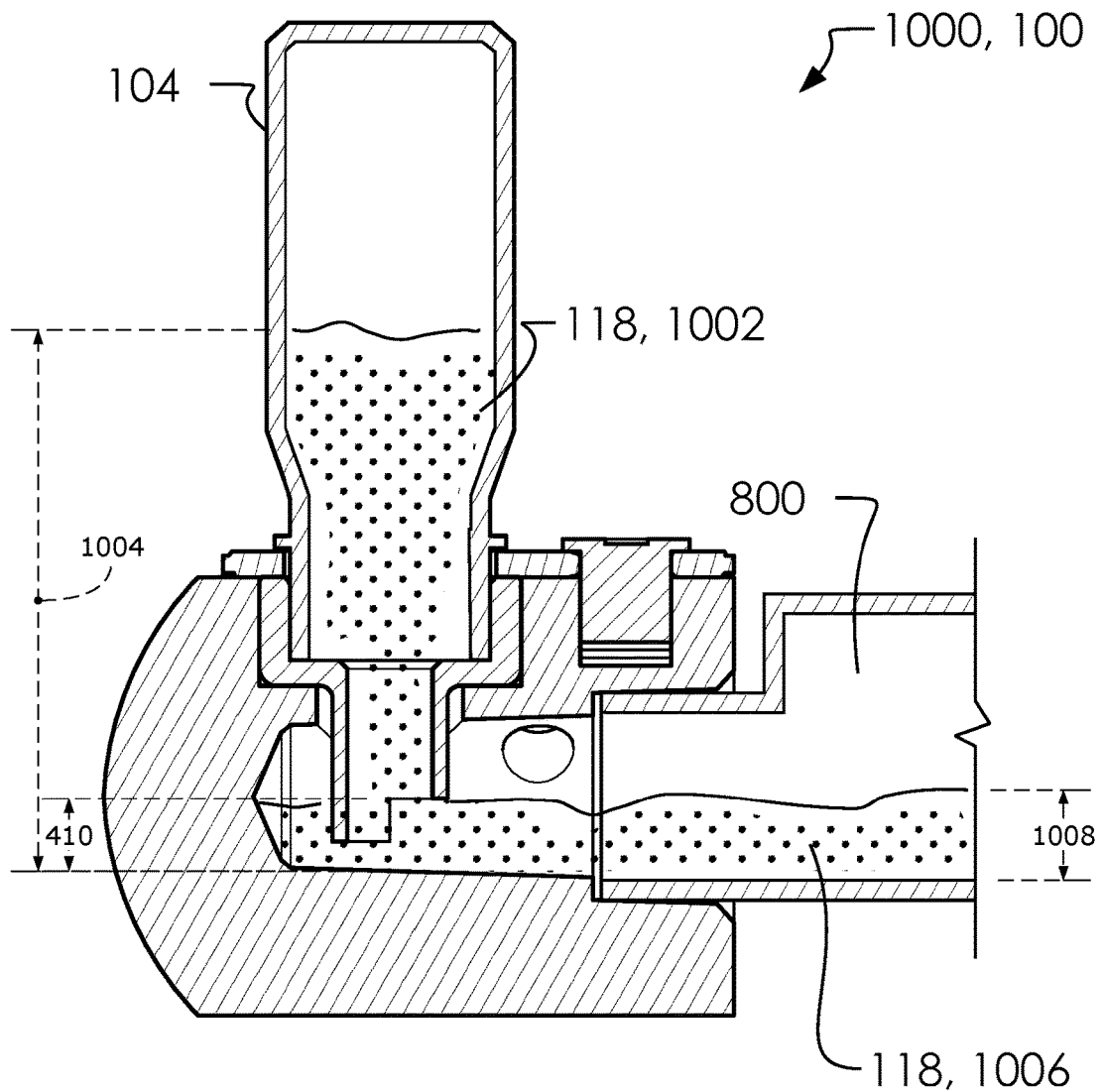
FIGS. 10-12 illustrate an elevated cross-section side view of said gravity oiler assembly 100 attached to said equipment fluid reservoir 700, with a fluid 118 illustrated in a first configuration 1000, a second configuration 1100 and a third configuration 1200, respectively.
Figure 11:
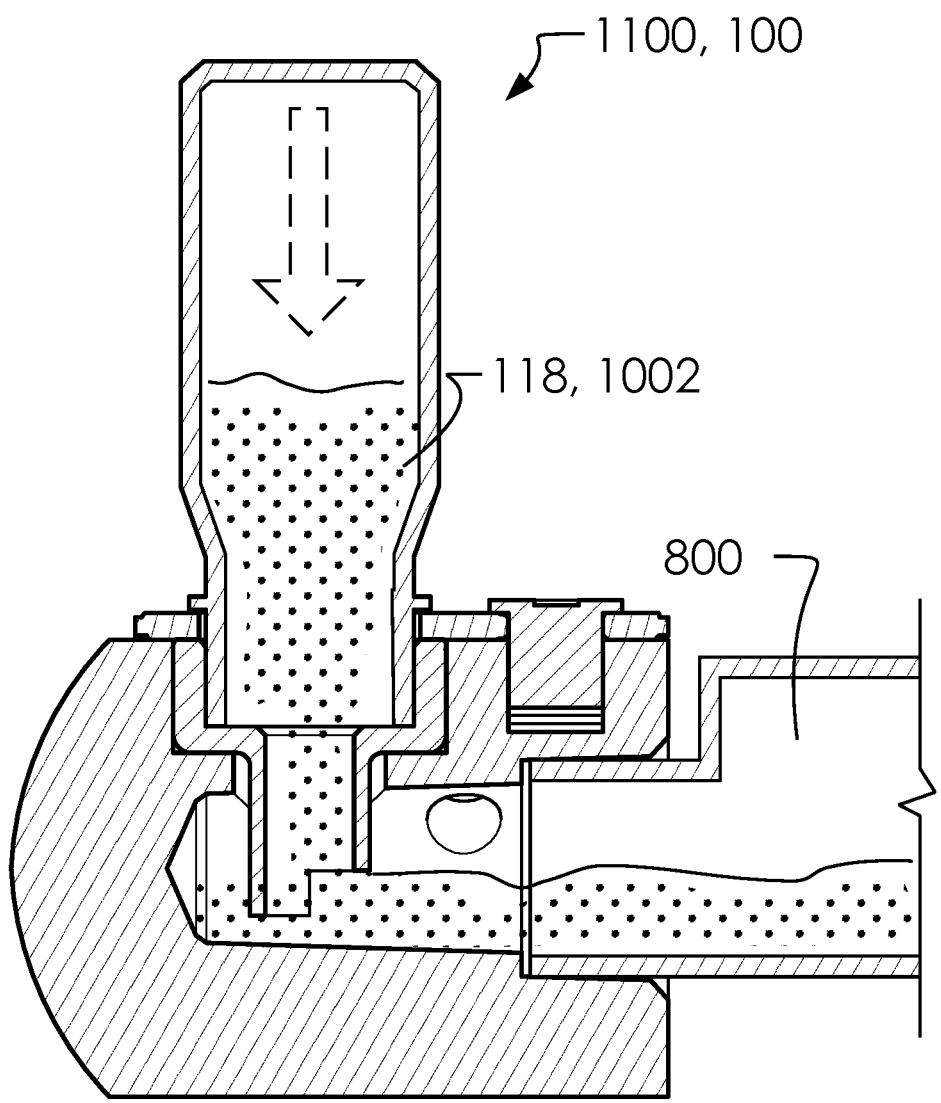
Figure 12:
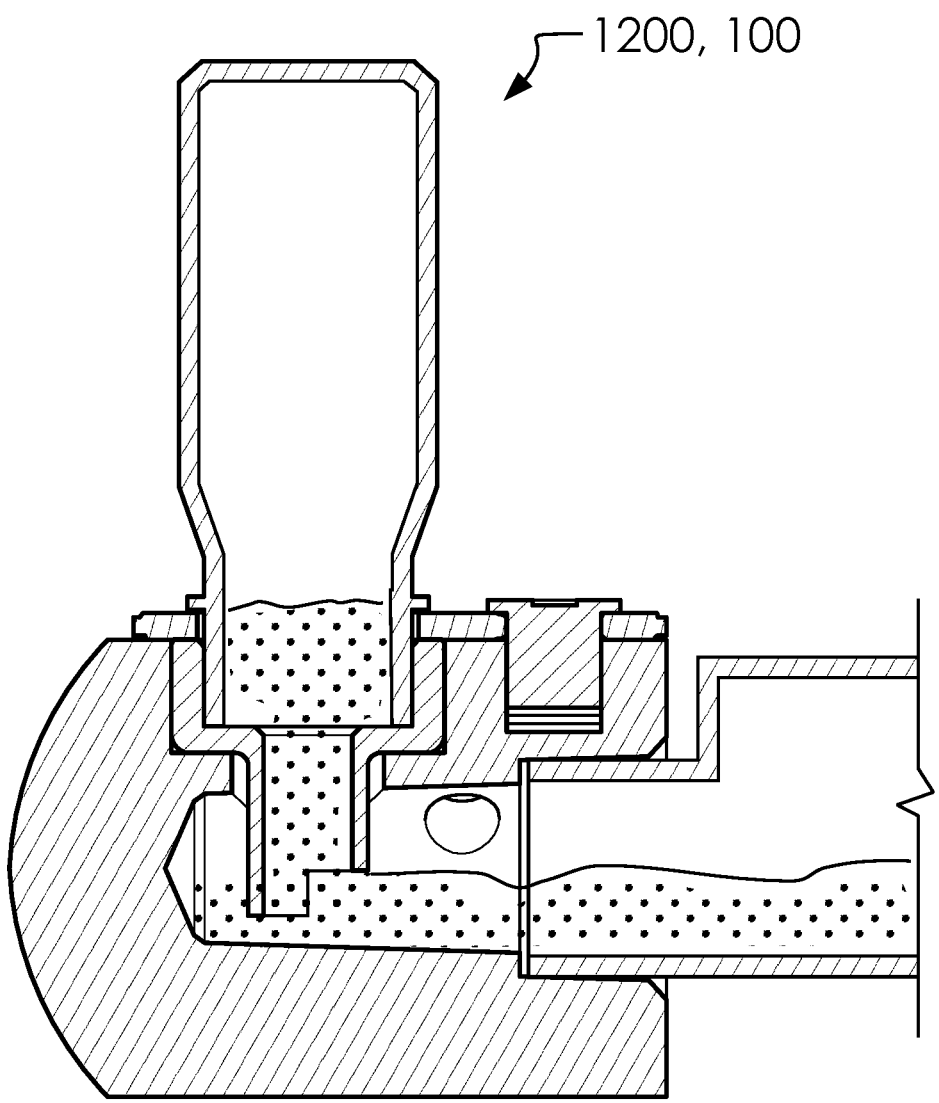

FIGS. 10-12 illustrate an elevated cross-section side view of said gravity oiler assembly 100 attached to said equipment fluid reservoir 700, with said fluid 118 illustrated in a first configuration 1000, a second configuration 1100 and a third configuration 1200, respectively.

In one embodiment, said fluid 118 can be stored in said input fluid reservoir 104 and dispensed into said equipment fluid cavity 800 of said equipment fluid reservoir 700 as needed. Wherein, a reservoir fluid portion 1002 within said input fluid reservoir 104 can comprise a first fluid level 1004, and a second fluid portion 1006 within a portion of said inner cavity 112 and said equipment fluid cavity 800 can comprise a fitting fluid level 1008, as illustrated.

As shown in said second configuration 1100 and said third configuration 1200, in one embodiment, as said second fluid portion 1006 falls below said nozzle exit height 410, said input fluid reservoir 104 is configured to allow said reservoir fluid portion 1002 to drain down into said inner cavity 112 and into said second fluid portion 1006.

Figure 13:
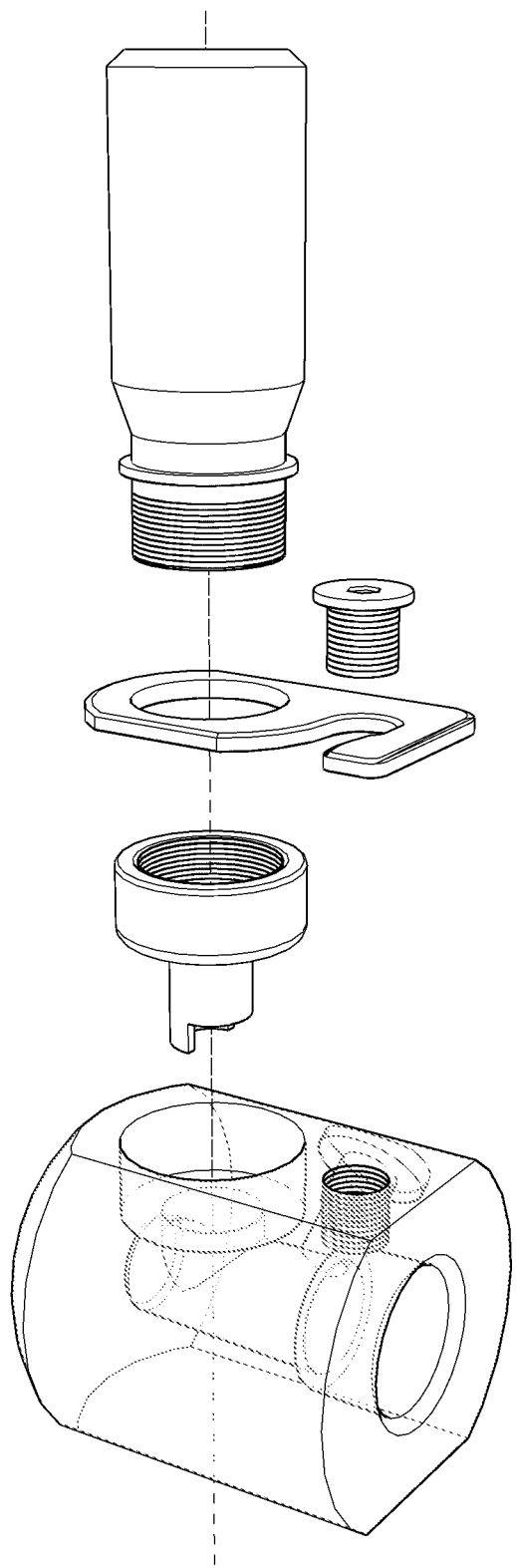
FIG. 13 illustrates an exploded perspective overview of said gravity oiler assembly 100.

FIG. 13 illustrates an exploded perspective overview of said gravity oiler assembly 100.

Figure 14A:
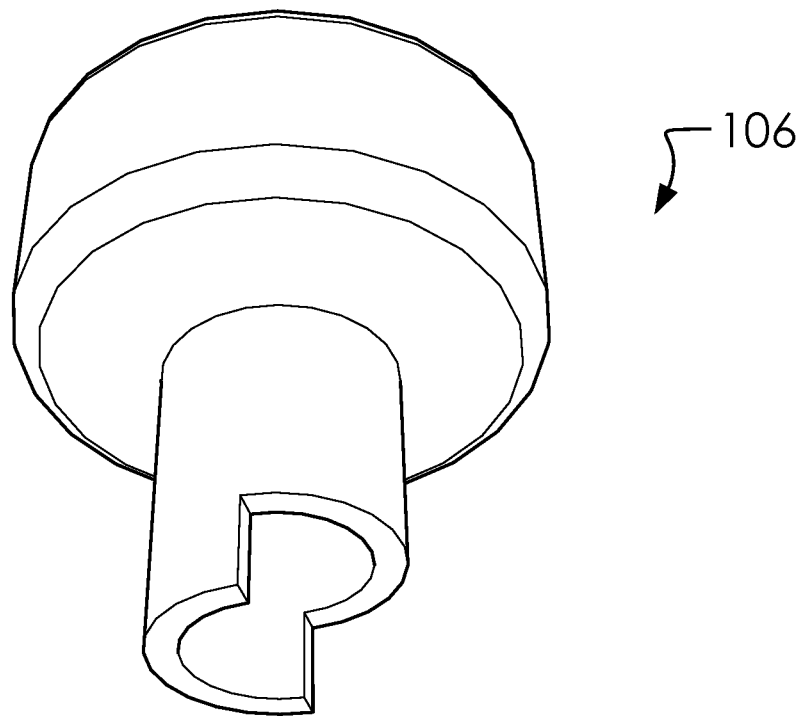
FIGS. 14A, and 14B illustrate a perspective overview and lower view of said nozzle 106.
Figure 14B:
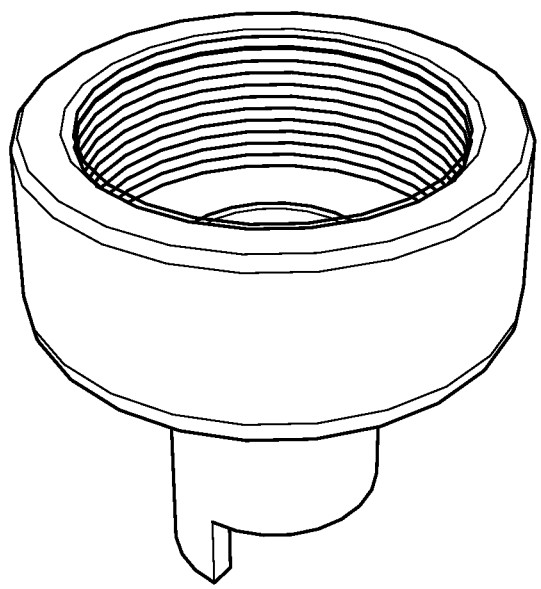

FIGS. 14A, and 14B illustrate a perspective overview and lower view of said nozzle 106.

Figure 15A:
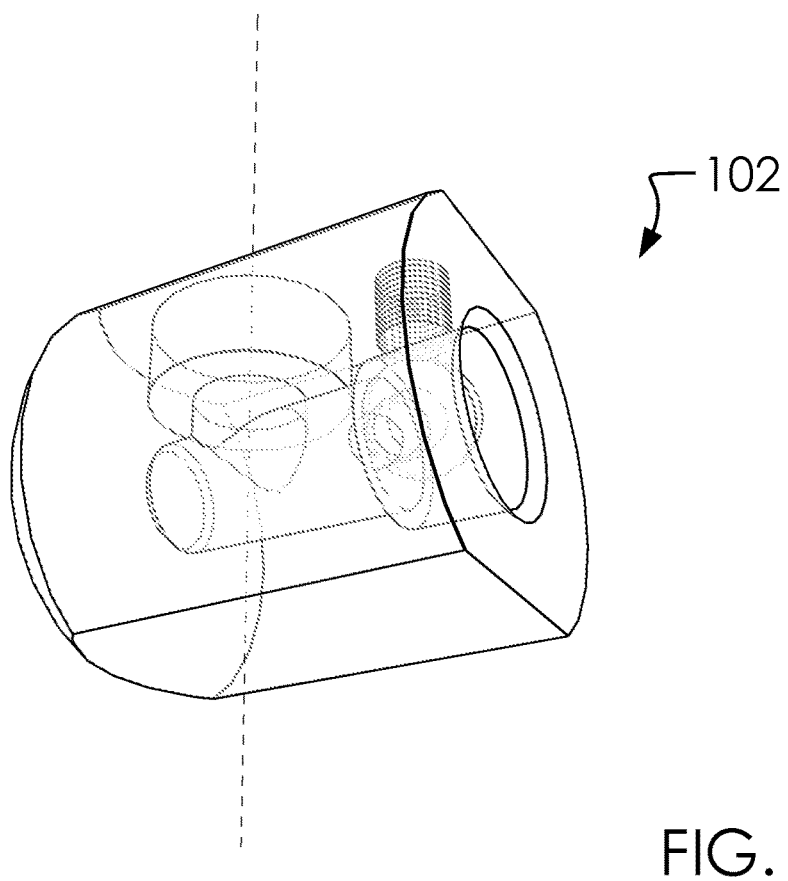
FIGS. 15A, and 15B illustrate a perspective lower and upper view of a fitting 102.
Figure 15B:
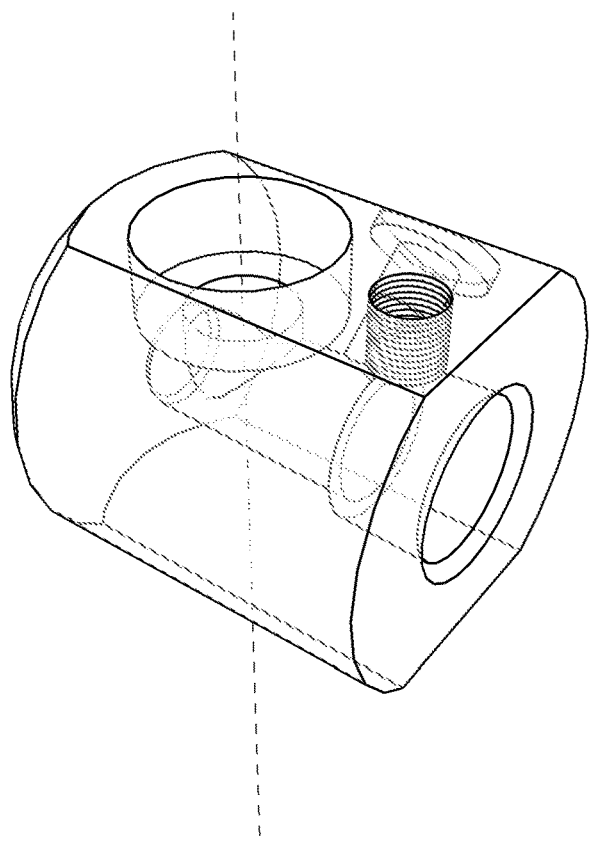

FIGS. 15A, and 15B illustrate a perspective lower and upper view of said fitting 102.

Figure 16:
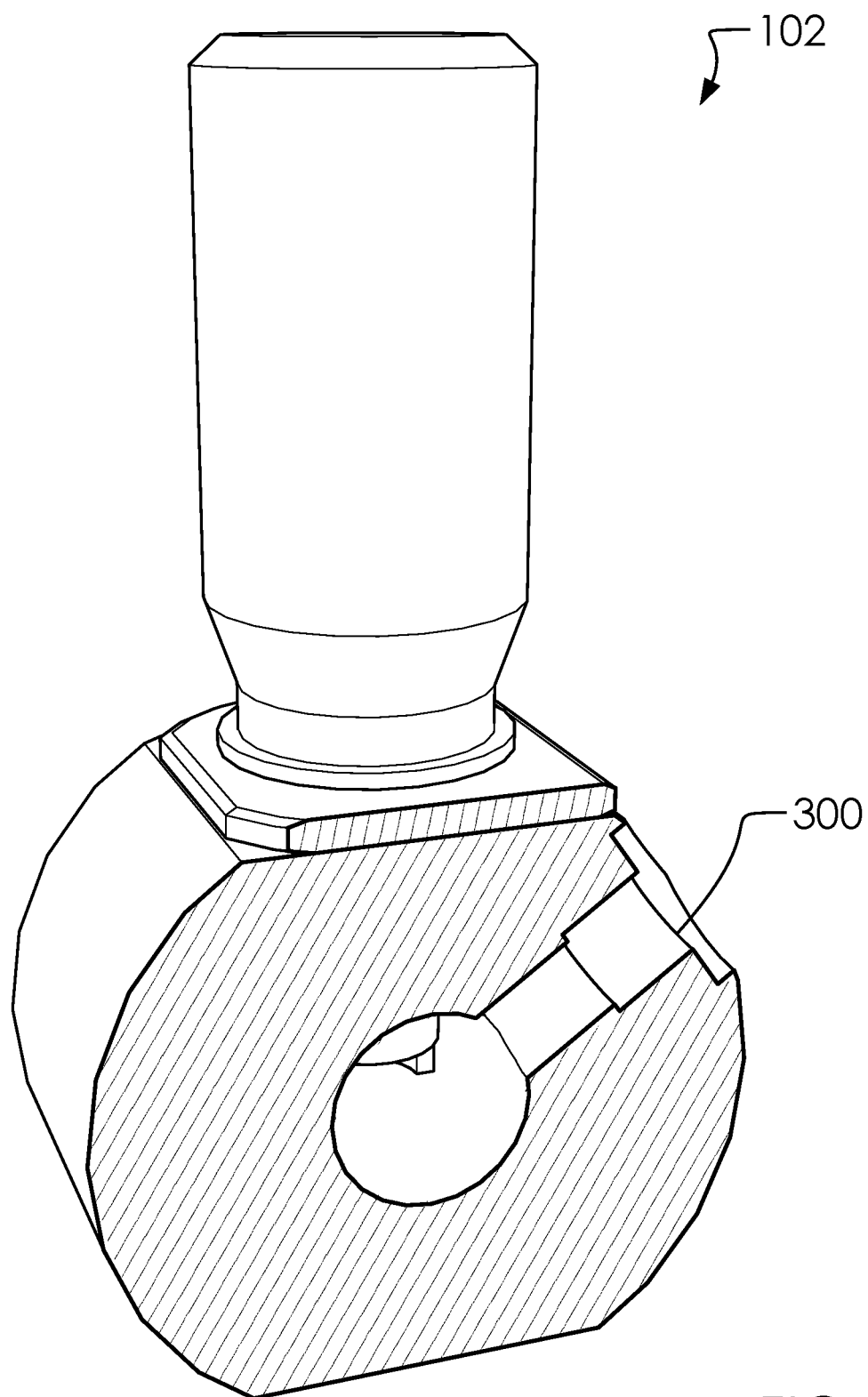
FIG. 16 illustrates a perspective overview of said gravity oiler assembly 100 with a cross-section cut through a vent port 300.

FIG. 16 illustrates a perspective overview of said gravity oiler assembly 100 with a cross-section cut through said vent port 300.

In one embodiment, said vent port 300 can comprise an aperture through said outer surface 110 and into said inner cavity 112. Said vent port 300 can be used to equalize pressure from said inner cavity 112 and an ambient air pressure outside of said fitting 102. In one embodiment, said vent port 300 can be used to recycle fluids into said gravity oiler assembly 100 where said gravity oiler assembly 100 is used in a closed loop system.

PARTS LISTING said gravity oiler assembly 100,
Said fitting 102,
Said input fluid reservoir 104,
Said nozzle 106,
Said fluid passage 108,
Said outer surface 110,
Said inner cavity 112,
Said top aperture 114,
Said side aperture 116, Said fluid 118,
Said dust shield 120,
Said dust shield fastener 122,
Said vent port 300,
Said fluid notch 400,
Said center axis 402,
Said bottle receiver 414,
Said lower nozzle 416,
Said extended lower portion 418,
Said nozzle exit height 410,
Said lower end 408,
Said fluid cavity 406,
Said fluid exit 500,
Said lower edge 502,
Said threaded socket 602,
Said equipment fluid reservoir 700,
Said equipment fluid cavity 800,
Said fluid intake 802,
Said fluid intake receiver 900,
Said first configuration 1000,
Said second configuration 1100,
Said third configuration 1200,
Said reservoir fluid portion 1002,
Said first fluid level 1004,
Said second fluid portion 1006, and
said fitting fluid level 1008.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein".

The invention claimed is:

1. A gravity oiler assembly for passively managing a fluid within an input fluid reservoir for use in an equipment fluid reservoir, wherein:
said gravity oiler assembly comprises a fitting, said input fluid reservoir, and a nozzle;
said fitting comprises an outer surface, an inner cavity, a top aperture, and a side aperture;
said input fluid reservoir comprises a bottle being arranged with a fluid passage attached to said nozzle;
said nozzle is arranged below said input fluid reservoir and inserted into said top aperture of said fitting;
said gravity oiler assembly is configured to allow said fluid in said input fluid reservoir to enter a portion of said nozzle, said inner cavity and said side aperture;
said gravity oiler assembly is configured to store said fluid in said input fluid reservoir and passively dispense said fluid into an equipment fluid cavity of said equipment fluid reservoir as a fitting fluid level drops below a upper edge of said nozzle;
said input fluid reservoir is configured to fit within a portion of said nozzle;
said nozzle is configured to fit in said top aperture of said fitting; and
a fluid cavity of said input fluid reservoir is in fluid connection with said inner cavity of said fitting.

2. The gravity oiler assembly of claim 1, wherein:
said fitting can further comprise a vent port; and
said vent port comprises an aperture through said outer surface and into said inner cavity.

3. The gravity oiler assembly of claim 2, wherein:
said vent port is used to equalize pressure from said inner cavity and an ambient air pressure outside of said fitting.

4. The gravity oiler assembly of claim 2, wherein:
said vent port is used to vent fluids, such as air, between said gravity oiler assembly and said input fluid reservoir where said gravity oiler assembly is used in a closed loop system.

5. The gravity oiler assembly of claim 1, wherein:
said nozzle comprises a fluid notch, a center axis, a bottle receiver, and a lower nozzle;
said lower nozzle comprises an extended lower portion and said fluid notch;
said fluid notch comprises a portion of said lower nozzle to be open to allow said fluid within said input fluid reservoir to flow out;
said fluid notch comprises a cut in a portion of said nozzle;
said fluid notch comprises a lower edge and an upper edge;
said lower edge and said upper edge are substantially parallel with one another;
said lower edge and said upper edge are separated by said nozzle exit height;
said nozzle exit height comprises a distance between the bottom of said fluid notch and an upper edge of said fluid notch;
said input fluid reservoir comprises said fluid passage; and
said input fluid reservoir is attached to said nozzle by placing said fluid passage at a lower end of said input fluid reservoir and attaching said input fluid reservoir to a portion of said nozzle.

6. The gravity oiler assembly of claim 5, wherein:
said lower edge and said upper edge are perpendicular to said center axis.

7. The gravity oiler assembly of claim 1, wherein:
said fluid notch comprises a fluid exit, and a lower edge;
said fluid exit is located in a lowest portion of said nozzle;
said lower edge comprises a surface around said fluid exit;
said fluid notch comprises a cut in an upper portion of said lower edge; and
said fluid notch can allow said fluid to break surface tension when emptying out of said input fluid reservoir and into a portion of said fitting.

8. The gravity oiler assembly of claim 1, wherein:
a portion of said input fluid reservoir and said nozzle comprises male and female threading configured to mate with one another.

9. A gravity oiler assembly for passively managing a fluid within an input fluid reservoir for use in an equipment fluid reservoir, wherein:
said gravity oiler assembly comprises a fitting, said input fluid reservoir, and a nozzle;
said fitting comprises an outer surface, an inner cavity, a top aperture, and a side aperture;
said input fluid reservoir comprises a bottle being arranged with a fluid passage attached to said nozzle;

said nozzle is arranged below said input fluid reservoir and inserted into said top aperture of said fitting;

said gravity oiler assembly is configured to allow said fluid in said input fluid reservoir to enter a portion of said nozzle, said inner cavity and said side aperture;

said gravity oiler assembly is configured to store said fluid in said input fluid reservoir and passively dispense said fluid into an equipment fluid cavity of said equipment fluid reservoir as a fitting fluid level drops below a upper edge of said nozzle;

said nozzle comprises a fluid notch, a center axis, a bottle receiver, and a lower nozzle;

said lower nozzle comprises an extended lower portion and said fluid notch;

said fluid notch comprises a portion of said lower nozzle to be open to allow said fluid within said input fluid reservoir to flow out;

said fluid notch comprises a cut in a portion of said nozzle;

said fluid notch comprises a lower edge and an upper edge;

said lower edge and said upper edge are substantially parallel with one another;

said lower edge and said upper edge are separated by said nozzle exit height;

said nozzle exit height comprises a distance between the bottom of said fluid notch and an upper edge of said fluid notch;

said input fluid reservoir comprises said fluid passage;

said input fluid reservoir is attached to said nozzle by placing said fluid passage at a lower end of said input fluid reservoir and attaching said input fluid reservoir to a portion of said nozzle;

said fluid notch comprises a fluid exit, and a lower edge;

said fluid exit is located in a lowest portion of said nozzle;

said lower edge comprises a surface around said fluid exit;

said fluid notch comprises a cut in an upper portion of said lower edge; and said fluid notch can allow said fluid to break surface tension when emptying out of said input fluid reservoir and into a portion of said fitting.

10. The gravity oiler assembly of claim 9, wherein:

said fitting can further comprise a vent port; and said vent port comprises an aperture through said outer surface and into said inner cavity.

11. The gravity oiler assembly of claim 10, wherein:

said vent port is used to equalize pressure from said inner cavity and an ambient air pressure outside of said fitting.

12. The gravity oiler assembly of claim 10, wherein:

said vent port is used to vent fluids, such as air, between said gravity oiler assembly and said input fluid reservoir where said gravity oiler assembly is used in a closed loop system.

13. The gravity oiler assembly of claim 9, wherein:

a portion of said input fluid reservoir and said nozzle comprises male and female threading configured to mate with one another.

14. The gravity oiler assembly of claim 9, wherein:

said input fluid reservoir can fit within a portion of said nozzle;

said nozzle can fit in said top aperture of said fitting; and a fluid cavity of said input fluid reservoir is in fluid connection with said inner cavity of said fitting.

15. A gravity oiler assembly for passively managing a fluid within an input fluid reservoir for use in an equipment fluid reservoir, wherein:

said gravity oiler assembly comprises a fitting, said input fluid reservoir, and a nozzle;

said fitting comprises an outer surface, an inner cavity, a top aperture, and a side aperture;

said input fluid reservoir comprises a bottle being arranged with a fluid passage attached to said nozzle;

said nozzle is arranged below said input fluid reservoir and inserted into said top aperture of said fitting;

said gravity oiler assembly is configured to allow said fluid in said input fluid reservoir to enter a portion of said nozzle, said inner cavity and said side aperture;

said gravity oiler assembly is configured to store said fluid in said input fluid reservoir and passively dispense said fluid into an equipment fluid cavity of said equipment fluid reservoir as a fitting fluid level drops below a upper edge of said nozzle; and a portion of said input fluid reservoir and said nozzle comprises male and female threading configured to mate with one another.

\* \* \* \* \*